(12) United States Patent
Mackay Pett

(10) Patent No.: US 12,428,320 B2
(45) Date of Patent: Sep. 30, 2025

(54) ULTRASONIC DEVICES AND METHODS FOR REGENERATION OF ACTIVATED CARBON

(71) Applicant: OZONO POLARIS, S.A. DE C.V., Puebla (MX)

(72) Inventor: David Ross Mackay Pett, San José del Puente (MX)

(73) Assignee: Ozono Polaris, S.A. DE C.V., Puebla (MX)

( * ) Notice: Subject to any disclaimer, the term of this patent is extended or adjusted under 35 U.S.C. 154(b) by 0 days.

(21) Appl. No.: 19/038,819

(22) Filed: Jan. 28, 2025

(65) Prior Publication Data

US 2025/0206640 A1   Jun. 26, 2025

Related U.S. Application Data

(63) Continuation of application No. PCT/IB2023/058159, filed on Aug. 11, 2023.

(60) Provisional application No. 63/371,430, filed on Aug. 15, 2022.

(51) Int. Cl.
| | |
|---|---|
| C02F 1/28 | (2023.01) |
| B01D 35/16 | (2006.01) |
| B01D 36/04 | (2006.01) |
| B01J 19/10 | (2006.01) |
| C02F 1/36 | (2023.01) |

(52) U.S. Cl.
CPC .............. *C02F 1/283* (2013.01); *B01D 35/16* (2013.01); *B01D 36/04* (2013.01); *B01J 19/10* (2013.01); *C02F 1/36* (2013.01); *C02F 2301/066* (2013.01); *C02F 2303/16* (2013.01)

(58) Field of Classification Search
CPC .......... B01D 35/16; B01D 36/04; B01J 19/10; B08B 3/12; C02F 1/283; C02F 1/36; C02F 2301/066; C02F 2303/16
See application file for complete search history.

(56) References Cited

U.S. PATENT DOCUMENTS

| | | |
|---|---|---|
| 2008/0128362 A1 | 6/2008 | Babaev |
| 2012/0181711 A1* | 7/2012 | Kang .................. B01F 23/2323 261/4 |
| 2013/0327720 A1 | 12/2013 | McGuire et al. |
| 2014/0190889 A1 | 7/2014 | Rietman et al. |

(Continued)

*Primary Examiner* — Patrick Orme
(74) *Attorney, Agent, or Firm* — Heslin Rothenberg Farley & Mesiti P.C.

(57) ABSTRACT

An ultrasonic generator system includes a beam having a length extending in a longitudinal direction. The beam is operable to be disposed in a filter tank, the filter tank housing a bed of activated carbon through which pressurized water flows. The beam includes a first and a second pair of opposing sidewalls that define a hollow interior therebetween. A first pair and a second pair of ultrasonic transducers are disposed on the first and second pair of opposing sidewalls, respectively. When pressurized water is not flowing through the tank, then the first pair of transduces are separated by a first air gap and the second pair of transducers are separated by a second air gap. When pressurized water is flowing through the tank, the first and second air gaps are closed by water pressure exerted by the pressurized water on the first and second pair of opposing sidewalls.

20 Claims, 12 Drawing Sheets

(56) References Cited

U.S. PATENT DOCUMENTS

2014/0290957 A1* 10/2014 McGuire .................. C02F 9/00
                                                      210/243
2019/0194035 A1    6/2019 Mackay Pett

* cited by examiner

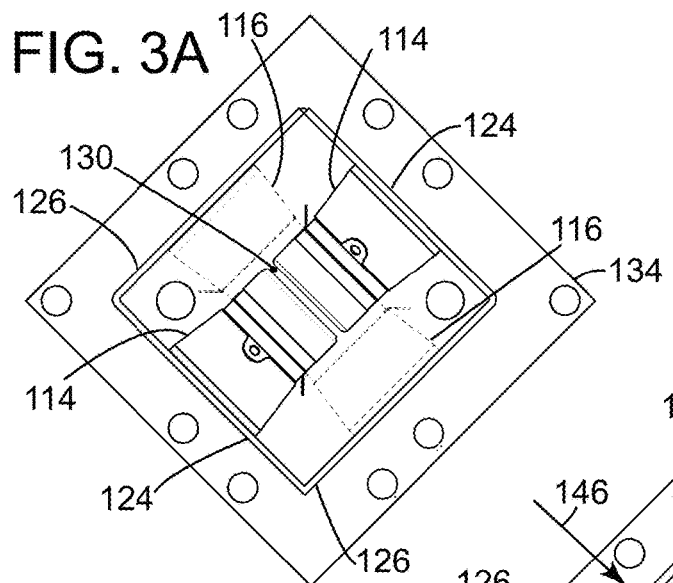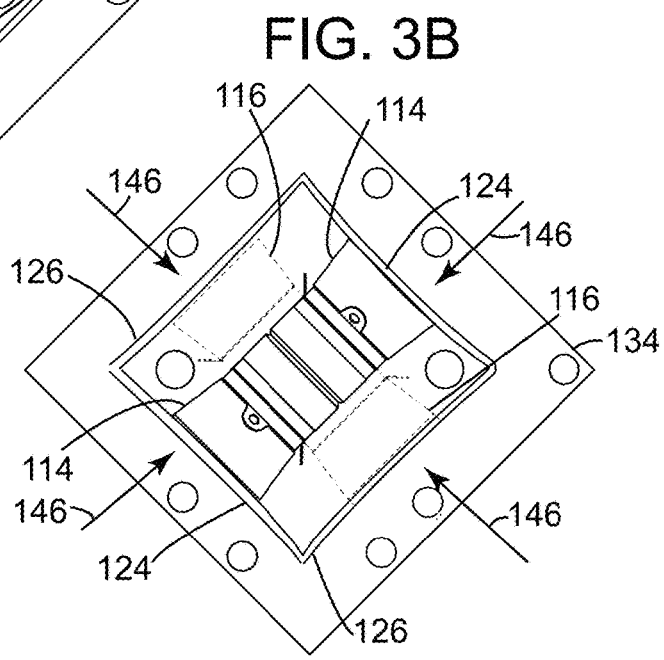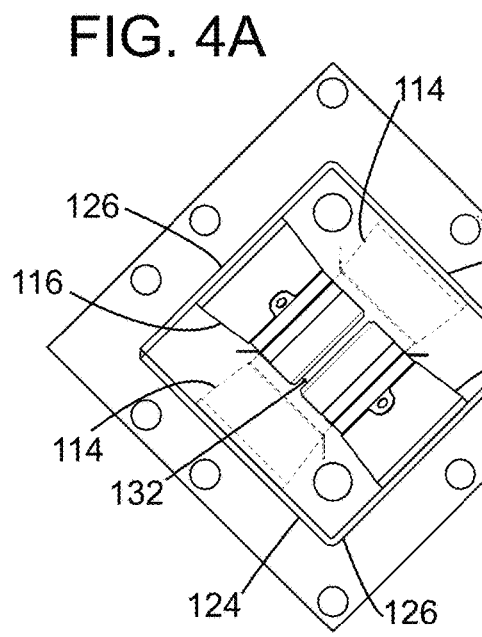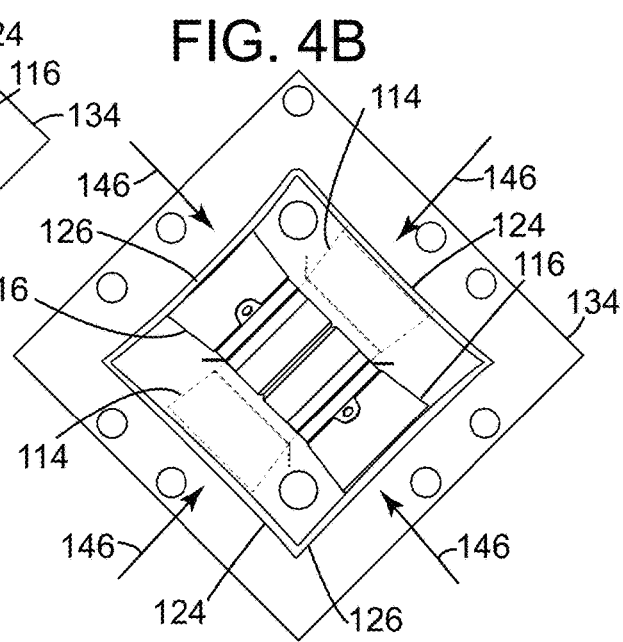

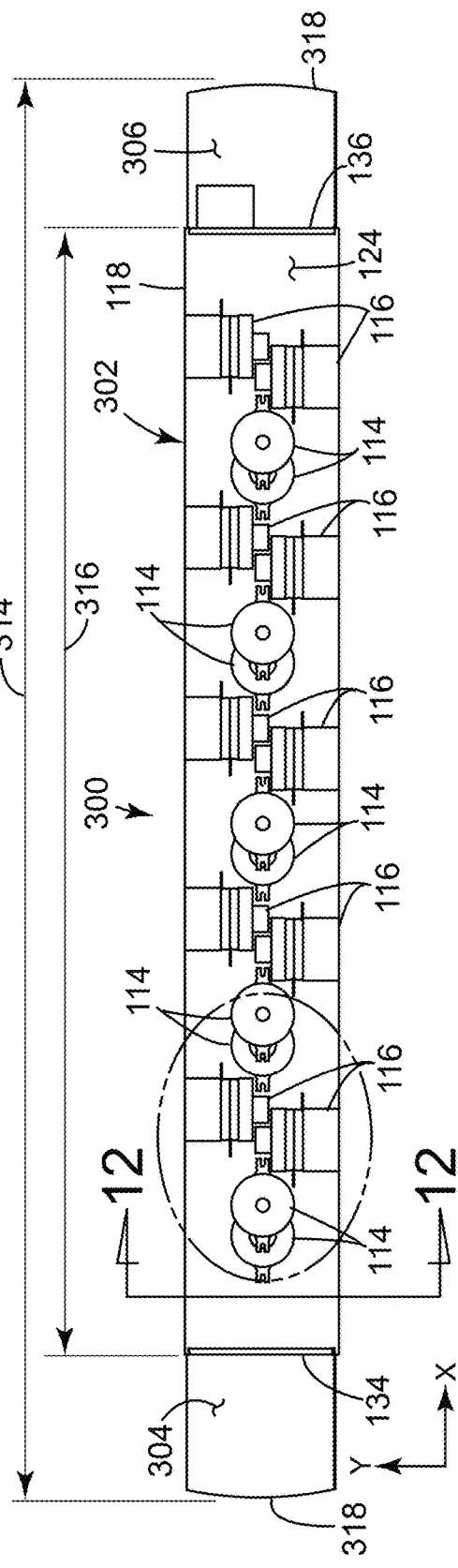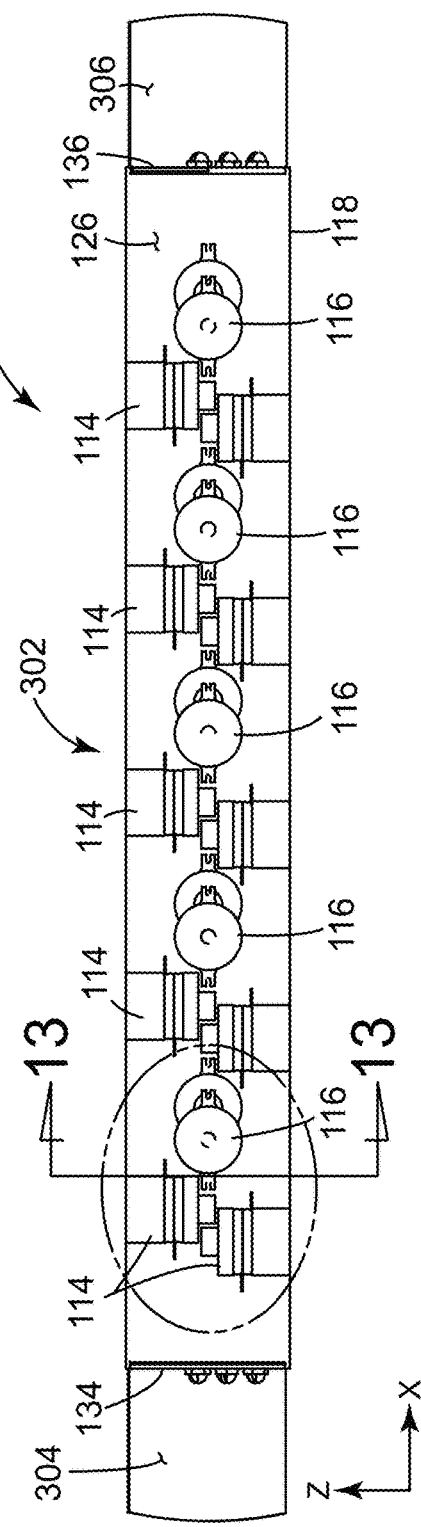

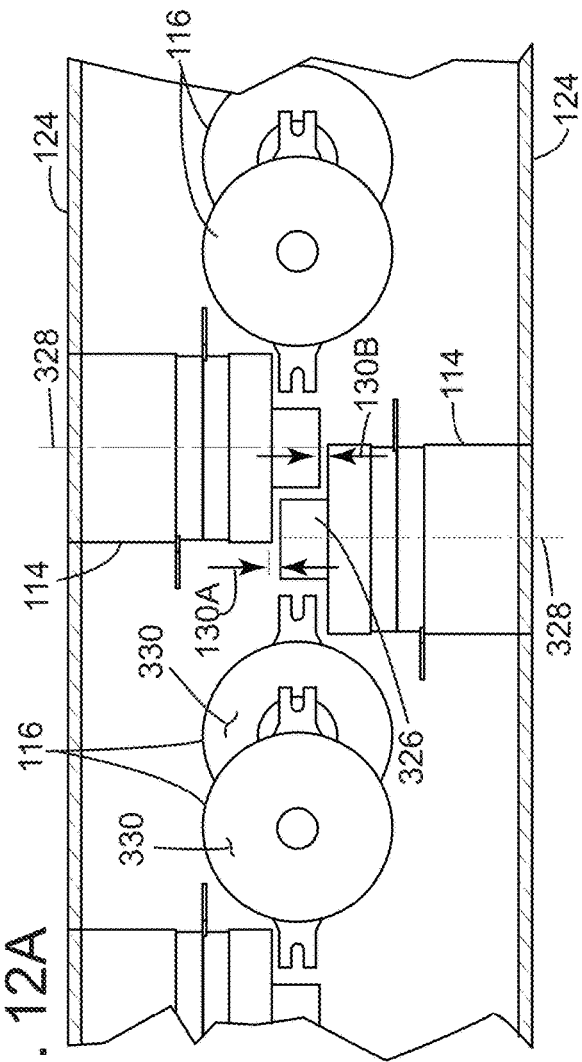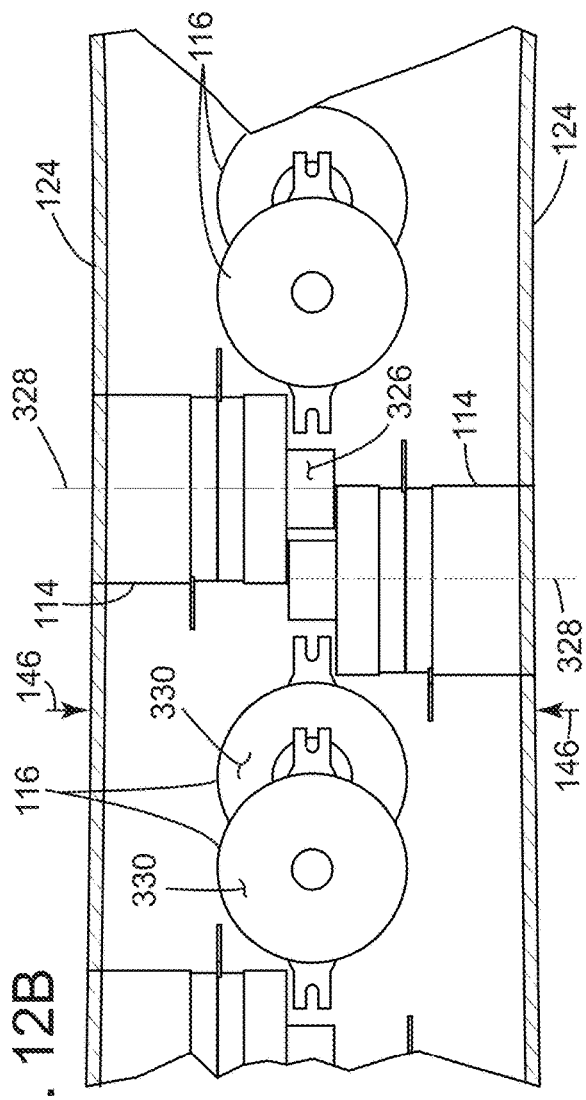

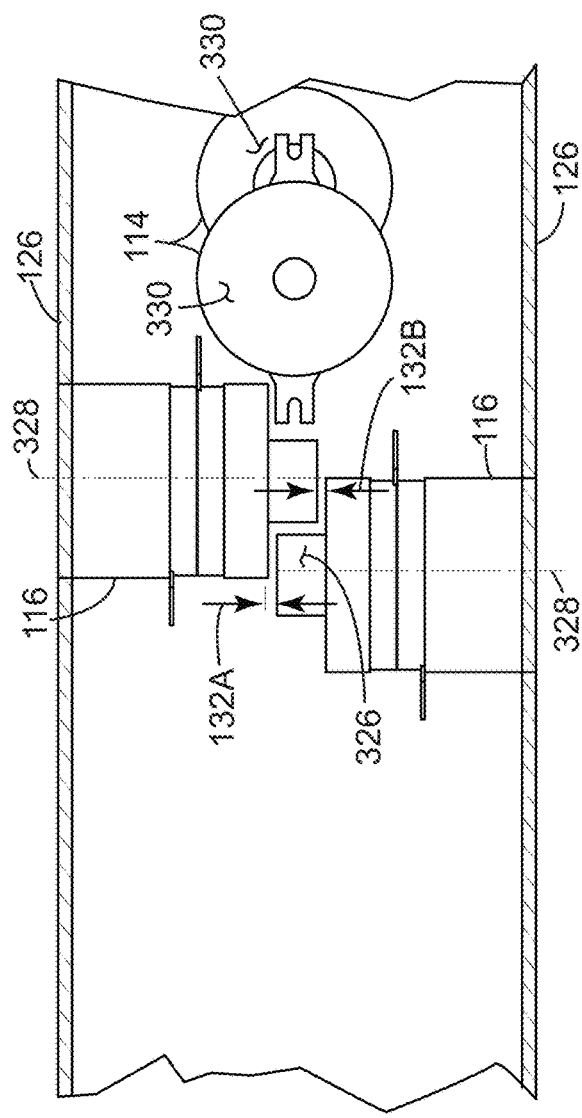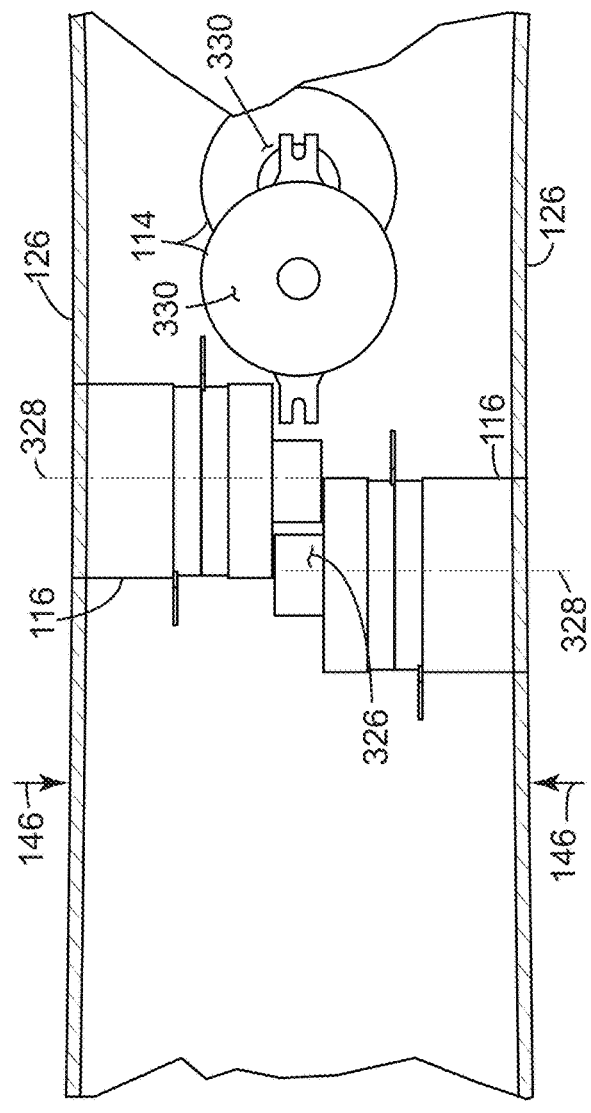

ULTRASONIC DEVICES AND METHODS FOR REGENERATION OF ACTIVATED CARBON

CROSS-REFERENCE TO RELATED APPLICATIONS

This application is a continuation of, and claims the benefit of, PCT Patent Application PCT/IB2023/058159, filed Aug. 11, 2023; which claims the benefit of U.S. provisional application 63/371,430, filed Aug. 15, 2022. The contents of the prior patent applications are hereby incorporated by reference herein in their entirety.

TECHNICAL FIELD

The present disclosure relates to devices and methods for regenerating absorptive media used in water treatment systems. More specifically, the disclosure relates to ultrasonic retrofittable devices and methods for regeneration of activated carbon.

BACKGROUND

Activated carbon (whether granular or in powder form) has been used for many of years to filter impurities from wastewater systems by adsorbing organic contaminants. However, when the activated carbon gets saturated with contaminants, the carbon must be either cleaned or disposed of.

Problematically, carbon is expensive to dispose of and can contribute to filling up of landfills. This is especially the case in large industrial facilities, such as municipal waste treatment plants, where large amounts of the saturated carbon must be removed and transported by truck.

Prior ultrasonic systems, which apply ultrasonic vibrations, have been investigated to regenerate and/or clean activated carbon though few, if any, large filters currently use the process. Proposed ultrasonic systems are stand-alone systems and often require significant modifications to the filter tanks that house the activated charcoal and through which the wastewater flows. Additionally, such prior ultrasonic systems are expensive to purchase and labor intensive to install. Also, once such prior ultrasonic systems are installed, they are generally dedicated to just one filter tank and cannot be used to clean any other filter tank. Large filtration systems commonly have multiple filtration tanks.

Accordingly, there is a need for a system for regenerating activated carbon, which does not require modification to the filter tanks. Further there is a need for an ultrasonic regenerator system or device that can be used on more than one filter tank system.

BRIEF DESCRIPTION

The present disclosure offers advantages and alternatives over the prior art by providing an ultrasonic generator system that is retrofittable to the inner sidewalls of a filter tank, wherein the filter tank houses a bed of activated carbon through which pressurized water flows.

An example of an ultrasonic generator system in accordance with one or more aspects of the present disclosure includes a beam having a length extending in a longitudinal direction. The beam is operable to be disposed in a filter tank, the filter tank housing a bed of activated carbon through which pressurized water flows. The beam includes a first and a second pair of opposing sidewalls that define a hollow interior therebetween. A first pair and a second pair of ultrasonic transducers are disposed on the first and second pair of opposing sidewalls, respectively. When pressurized water is not flowing through the tank, then the first pair of transduces are separated by a first air gap and the second pair of transducers are separated by a second air gap. When pressurized water is flowing through the tank, the first and second air gaps are closed by water pressure exerted by the pressurized water on the first and second pair of opposing sidewalls.

Another example of an ultrasonic generator system in accordance with one or more aspects of the present disclosure includes a beam having a length extending in a longitudinal direction. The beam is operable to be disposed in a filter tank, the filter tank housing a bed of activated carbon through which pressurized water flows. The beam includes a first and a second pair of opposing sidewalls that define a hollow interior therebetween. A plurality of first pair of ultrasonic transducers is disposed on the first pair of opposing sidewalls. A plurality of second pair of ultrasonic transducers is disposed on the second pair of opposing sidewalls. Each first pair and each second pair of transducers are alternately disposed along a longitudinal length of the interior of the beam. When pressurized water is not flowing through the tank, then each first pair of transduces are separated by a first air gap and each second pair of transducers are separated by a second air gap, and the first and second pairs of transducers are operable to generate ultrasonic vibrations to regenerate the activated carbon while the activated carbon is fluidized for washing and the expanded activated carbon bed surrounds the beam. When the pressurized water is flowing through the tank, then the first and second air gaps are closed by water pressure exerted by the pressurized water on the first and second pair of opposing sidewalls. Each pair of the first pair of transducers abut together to provide structural support against the water pressure for the first pair of opposing sidewalls. Each pair of the second pair of transducers abut together to provide structural support against the water pressure for the second pair of opposing sidewalls.

An example of a method of regenerating activated carbon includes providing an ultrasonic generator system. The ultrasonic generator system includes:
  A beam having a length extending in a longitudinal direction. The beam is operable to be disposed in a filter tank, the filter tank housing a bed of activated carbon through which pressurized water flows. The beam includes a first and a second pair of opposing sidewalls that define a hollow interior therebetween.
  A first pair and a second pair of ultrasonic transducers disposed on the first and second pair of opposing sidewalls, respectively. The first pair of transduces are separated by a first air gap and the second pair of transducers are separated by a second air gap when pressurized water is not flowing in the tank.
  A first and a second end plate is attached to opposing distal ends of the first and second pairs of sidewalls. The first and second end plates, first and second transducers and first and second sidewalls form a first beam module.

Ultrasonic vibrations are generated from the first and second pair of transducers to regenerate the activated carbon, when pressurized water in not flowing in the tank. The first and second gaps are closed by water pressure exerted on the first and second sidewalls when pressurized water is flowing in the tank, such that the first pair of transducers abut together to provide structural support against the water pressure for the first pair of opposing sidewalls and the second pair of transducers abut together to provide structural support against the water pressure for the second pair of opposing sidewalls.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

BRIEF DESCRIPTION OF THE DRAWINGS

The disclosure will be more fully understood from the following detailed description taken in conjunction with the accompanying drawings, in which:

FIG. 3A depicts an example of a cross sectional view of FIG. 1, taken through the line 3-3 of FIG. 1, when the pressurized water is not flowing, according to aspects described herein;

FIG. 3B depicts an example of a cross sectional view of FIG. 1, taken through the same line 3-3, when the pressurized water is flowing, according to aspects described herein;

FIG. 4A depicts an example of a cross sectional view of FIG. 1, taken through the line 4-4 of FIG. 1, when the pressurized water is not flowing, according to aspects described herein;

FIG. 4B depicts an example of a cross sectional view of FIG. 1, taken through the same line 4-4, when the pressurized water is flowing, according to aspects described herein;

FIG. 10A depicts an example of a first side view of the ultrasonic generator system of FIG. 9, in accordance with aspects described herein;

FIG. 10B depicts an example of a second side view of the ultrasonic generator system of FIG. 9, wherein the second side view of FIG. 10B is rotated 90 degrees relative to the first side view of FIG. 10A, in accordance with aspects described herein.

FIG. 12A depicts an example of a cross-sectional view of FIG. 10 taken along the line 12-12, when the pressurized water is not flowing, according to aspects described herein;

FIG. 12B depicts an example of a cross-sectional view of FIG. 10 taken along the line 12-12, when the pressurized water is flowing, according to aspects described herein;

FIG. 13A depicts an example of a cross-sectional view of FIG. 10 taken along the line 13-13, when the pressurized water is not flowing, according to aspects described herein; and FIG. 13B depicts an example of a cross-sectional view of FIG. 10 taken along the line 13-13, when the pressurized water is not flowing, according to aspects described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
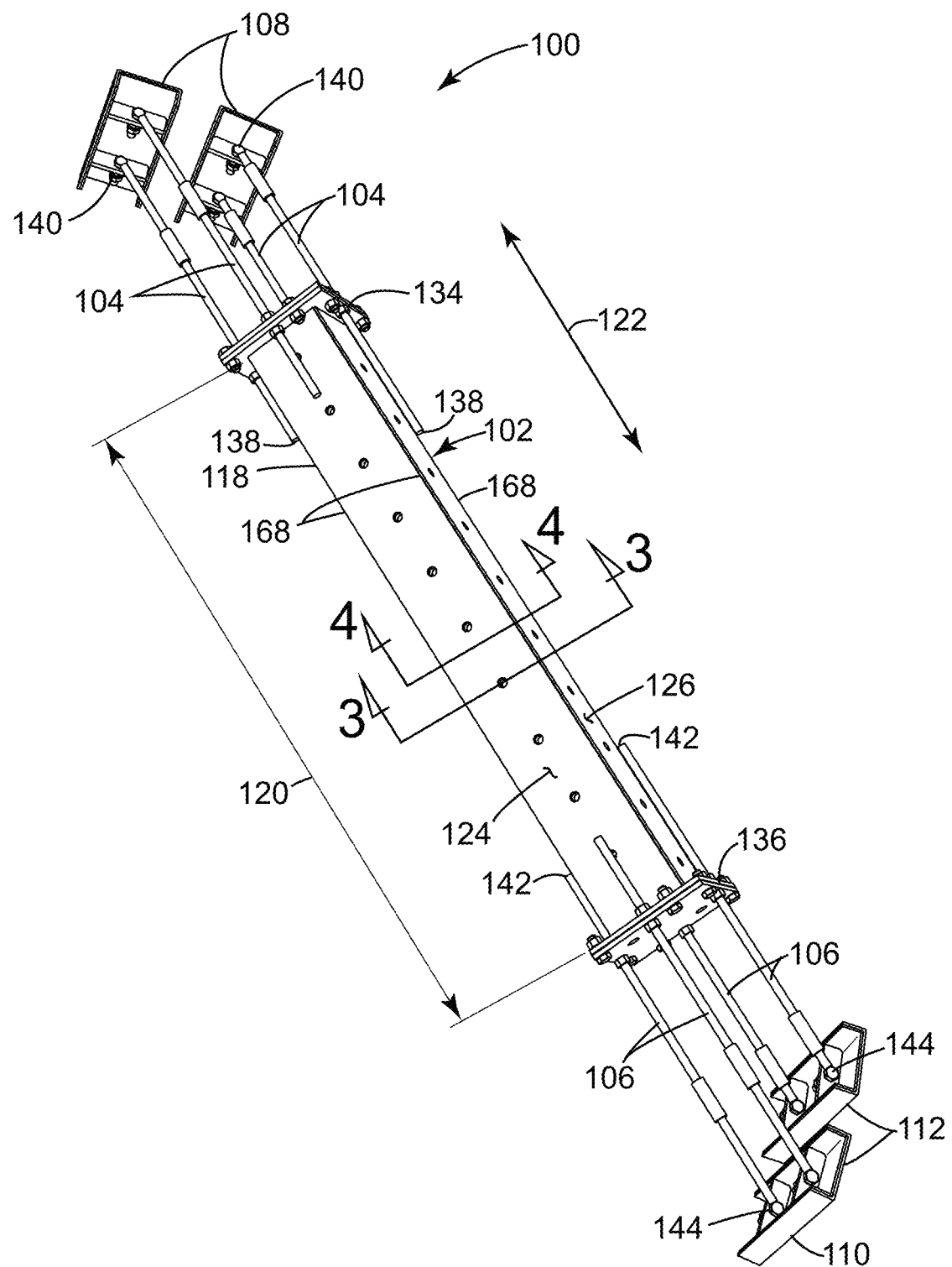
FIG. 1 depicts an example of a perspective view of an ultrasonic generator system, according to aspects described herein.
Figure 2:
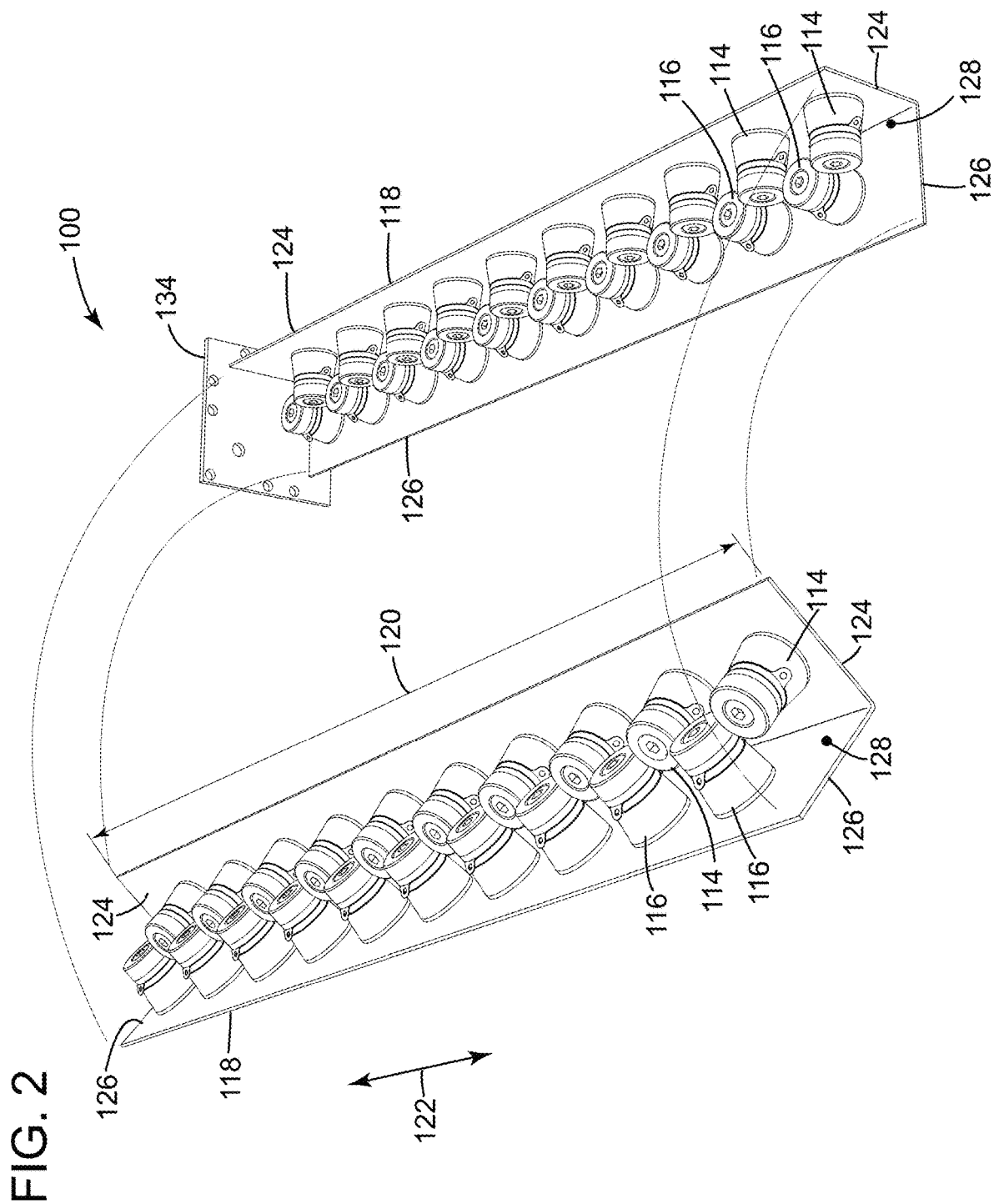
FIG. 2 depicts an example of an exploded view of the ultrasonic generator system of FIG. 1, according to aspects described herein.

Referring to FIGS. 1 and 2, an example is depicted of a perspective view (FIG. 1) and an exploded view (FIG. 2) of an ultrasonic generator system 100, according to aspects described herein. As will be explained in greater detail herein, the ultrasonic generator system 100 may include a generally square first beam module 102 attached to a plurality (in this example 4) of first support rods 104 and a plurality of second support rods 106 (in this example 4) on opposing ends of the first beam module 102. The plurality of first support rods 104 may be attached to a first pair of feet 108 that are covered by a resilient material 110 and the plurality of second support rods 106 may be attached to a second pair of feet 112 that are also covered in a resilient material 110.

The ultrasonic generator system 100 is operable to be installed in a filter tank 148 (see FIG. 5), without having to modify the tank. The filter tank 148 is operable to house a bed of activated carbon (not shown) through which pressurized water flows. The ultrasonic generator system 100 may be installed in the tank 148 immediately above the bed of activated carbon. When the pressurized water is flowing, the activated carbon filters and removes impurities from the flow of water and first and second ultrasonic transducers 114 and 116 disposed in the ultrasonic generator system 100 are dormant. When the pressurized water is not flowing, backflow fluidizes and expands the activated carbon bed up around the beam as the transducers 114, 116 are active and generate ultrasonic vibrations to regenerate the activated carbon.

The ultrasonic generator system 100 may be retrofittable into a variety of different types of filter tanks and filter system and may be used with many different types of methods for sanitizing and/or regenerating activate carbon or other porous media. Examples of such systems and methods are described in U.S. Pat. No. 9,375,663 to MacKay Pett, filed on Jun. 1, 2015 and titled: "Sanitization and Regeneration of Porous Filter Media with Ozone in Backwash" and in U.S. Pat. No. 10,906,818 to MacKay Pett, filed on Dec. 21, 2018 and titled: "Process For Back-And-Forth Washing Of Adsorptive Media. The contents of both of these patent applications being hereby incorporated by reference herein in their entirety.

More specifically, the first beam module 102 of the ultrasonic generator system 100 includes a beam 118 having a length 120 extending in a longitudinal direction (as indicated by longitudinal arrow 122). The beam 118 is operable to be disposed in a filter tank 148, the filter tank housing a bed of activated carbon (now shown) through which pressurized water flows (not shown). The beam 118 includes a first pair of sidewalls 124 and a second pair of opposing sidewalls 126 that define a hollow interior 128 therebetween.

At least a first pair of ultrasonic transducers 114 (and in this example, a plurality of first pairs of ultrasonic transducers 114) is disposed on the first pair of opposing sidewalls 124. At least a second pair of ultrasonic transducers 116 (and in this example, a plurality of second pairs of ultrasonic transducers 116) is disposed on the second pair of opposing sidewalls 126.

When pressurized water is not flowing through the tank 148, then the first pair of transduces 114 are separated by a first air gap 130 (see FIG. 3A) and the second pair of transducers 116 are separated by a second air gap 132 (see FIG. 4A). Also, when the first and second pair of transducers 114, 116 are separated by their respective first and second air gaps 130, 132, then the first and second pair of transducers 114, 116 are operable to generate ultrasonic vibrations to regenerate the activated carbon in the bed of activated carbon.

When the pressurized water is flowing through the tank 148, then the first and second gaps 130, 132 are closed by the water pressure 146 (see FIGS. 3B and 4B) exerted by the pressurized water on the first and second pair of opposing sidewalls 124, 126. The water pressure may be within a range of up to about to 150 pounds per square inch gage (psig). Advantageously, the first pair of transducers 114 abut together to provide structural support against the water pressure 146 for the first pair of opposing sidewalls 124 and the second pair of transducers 116 abut together to provide structural support against the water pressure 146 for the second pair of opposing sidewalls 126.

In the example illustrated in FIG. 2, there are a plurality of first and second pair of transducers 114, 116 disposed along the first and second pair of sidewalls 124, 126. Each of the first pair of transducers 114 and each second pair of transducers 116 are alternately disposed along a longitudinal length 120 of the interior 128 of the beam 118.

The beam 118 also includes a first end plate 134 and a second end plate 136 attached to opposing distal ends of the first and second pairs of sidewalls 124, 126. The first and second end plates 134, 136, first and second transducers 114, 116 and first and second sidewalls 124, 126 form the first beam module 102.

The ultrasonic generator system 100 also includes a plurality of first support rods 104 and the plurality of second support rods 106. The first support rods 104 each have a first distal end 138 and a second distal end 140. Each first support rod 104 may be attached to the first end plate 134 of the first beam module 102 at the first distal end 138 of each first support rod 104. Alternatively, each first support rod 104 may be attached to the first end plate 134 by threading the first distal end 138 of each first support rod 104 through threaded holes in the first end plate 134. The plurality of second support rods 106 each have a first distal end 142 and a second distal end 144. Each second support rod 106 may be attached to the second end plate 136 of the first beam module 102 at the first distal end 142 of each second support rod 106. Alternatively, each second support rod 106 may be attached to the second end plate 136 by threading the first distal end 142 of each second support rod 106 through threaded holes in the second end plate 136.

The first pair of feet 108 are pivotally attached to the second distal ends 140 of each of the first support rods 104. Each foot of the first pair of feet 108 is covered with a resilient material 110. The resilient material may be rubber or the like. The second pair of feet 112 are pivotally attached to the second distal ends 144 of each of the second support rods 106. Each foot of the second pair of feet 112 is covered with the resilient material 110.

The first and second pair of feet 108, 112 are operable to be adjusted by the first and second support rods 104, 106 respectively in opposing longitudinal directions 122 relative to the length 120 of the beam 118 to press and secure the beam 118 against curved or straight inner side walls 154 (see FIG. 5) of the tank 148 in the longitudinal direction 122. When the first beam 118 is secured in the tank 148, it is positioned immediately over the bed of activated carbon.

Referring to FIG. 3A, an example is depicted of a cross sectional view of FIG. 1, taken through the line 3-3 of FIG. 1 when the pressurized water is not flowing, according to aspects described herein. Also referring FIG. 3B, an example is depicted of a cross sectional view of FIG. 1, taken through the same line 3-3, when the pressurized water is flowing, according to aspects described herein.

FIG. 3A shows a cross sectional view of a first pair of ultrasonic transducers 114 disposed on the first pair of opposing sidewalls 124. When the pressurized water is not flowing, the first sidewalls 124 of the beam 118 are not under pressure 146 exerted by the pressurized water. Accordingly, the distal ends of the first pair of transducers 114 are separated by the first air gap 130.

However, as illustrated in FIG. 3B, when the water is flowing and the water pressure 146 is exerted on the first sidewalls 124, then the first sidewalls bow inwardly, closing the first air gap 130. Advantageously, once the pair of first transducers 114 abut together, they provide structural support against the water pressure 146, preventing the first sidewalls 124 from collapsing any further.

Referring to FIG. 4A, an example is depicted of a cross sectional view of FIG. 1, taken through the line 4-4 of FIG. 1 when the pressurized water is not flowing, according to aspects described herein. Also referring FIG. 4B, an example is depicted of a cross sectional view of FIG. 1, taken through the same line 4-4, when the pressurized water is flowing, according to aspects described herein.

FIG. 4A shows a cross sectional view of a second pair of ultrasonic transducers 116 disposed on the second pair of opposing sidewalls 126. When the pressurized water is not flowing, the second sidewalls 126 of the beam 118 are not under pressure 146 exerted by the pressurized water. Accordingly, the distal ends of the second pair of transducers 116 are separated by the second air gap 132.

However, as illustrated in FIG. 4B, when the water is flowing and the water pressure 146 is exerted on the second sidewalls 126, then the second sidewalls bow inwardly, closing the second air gap 132. Advantageously, once the pair of second transducers 116 abut together, they provide structural support against the water pressure 146, preventing the second sidewalls 126 from collapsing any further.

Figure 5:
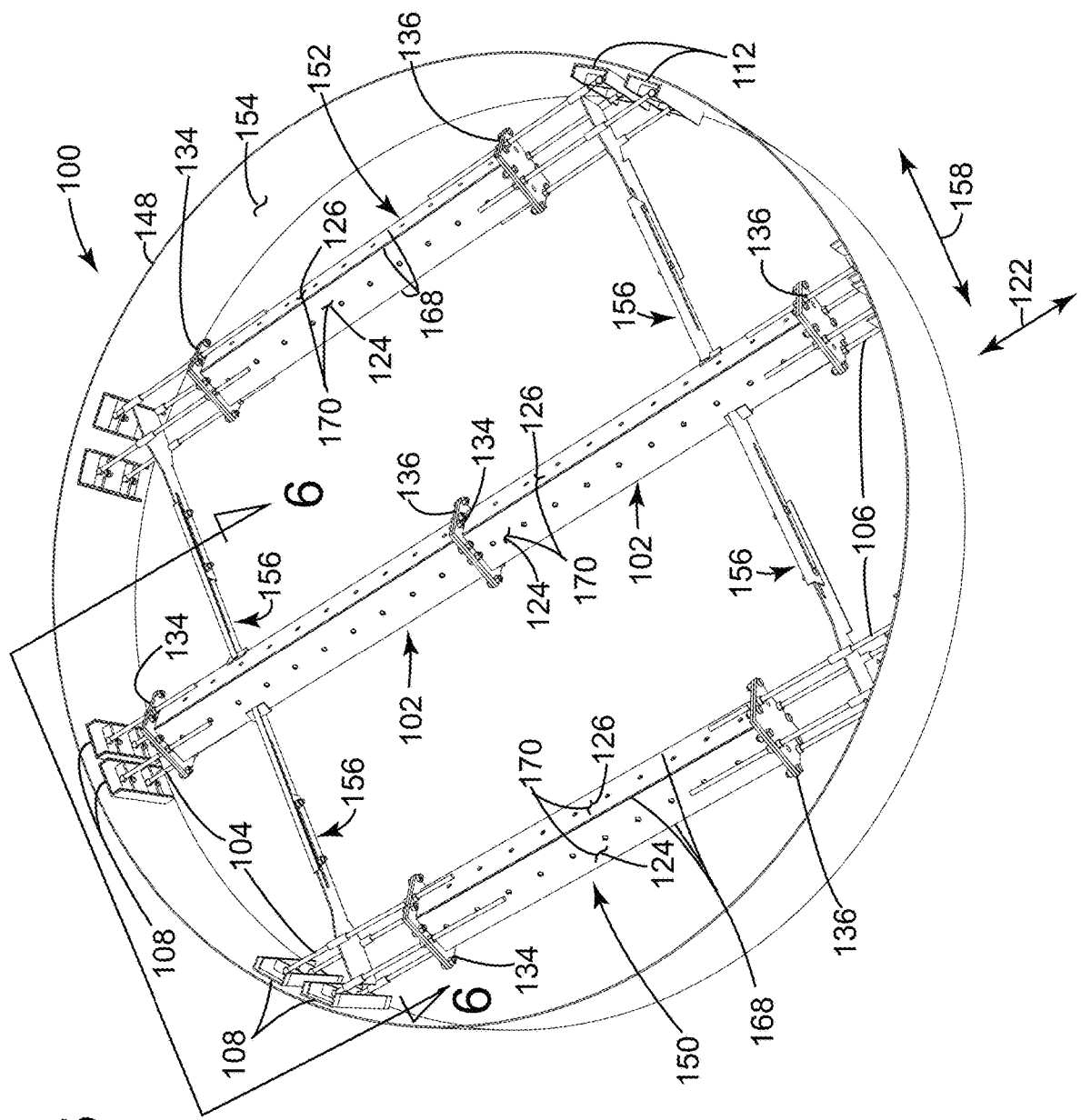
FIG. 5 depicts an example of a top perspective view of the ultrasonic generator system of FIG. 1 having a plurality of first beam modules, a second beam module and a third beam module disposed within a tank, according to aspects described herein.
Figure 6:
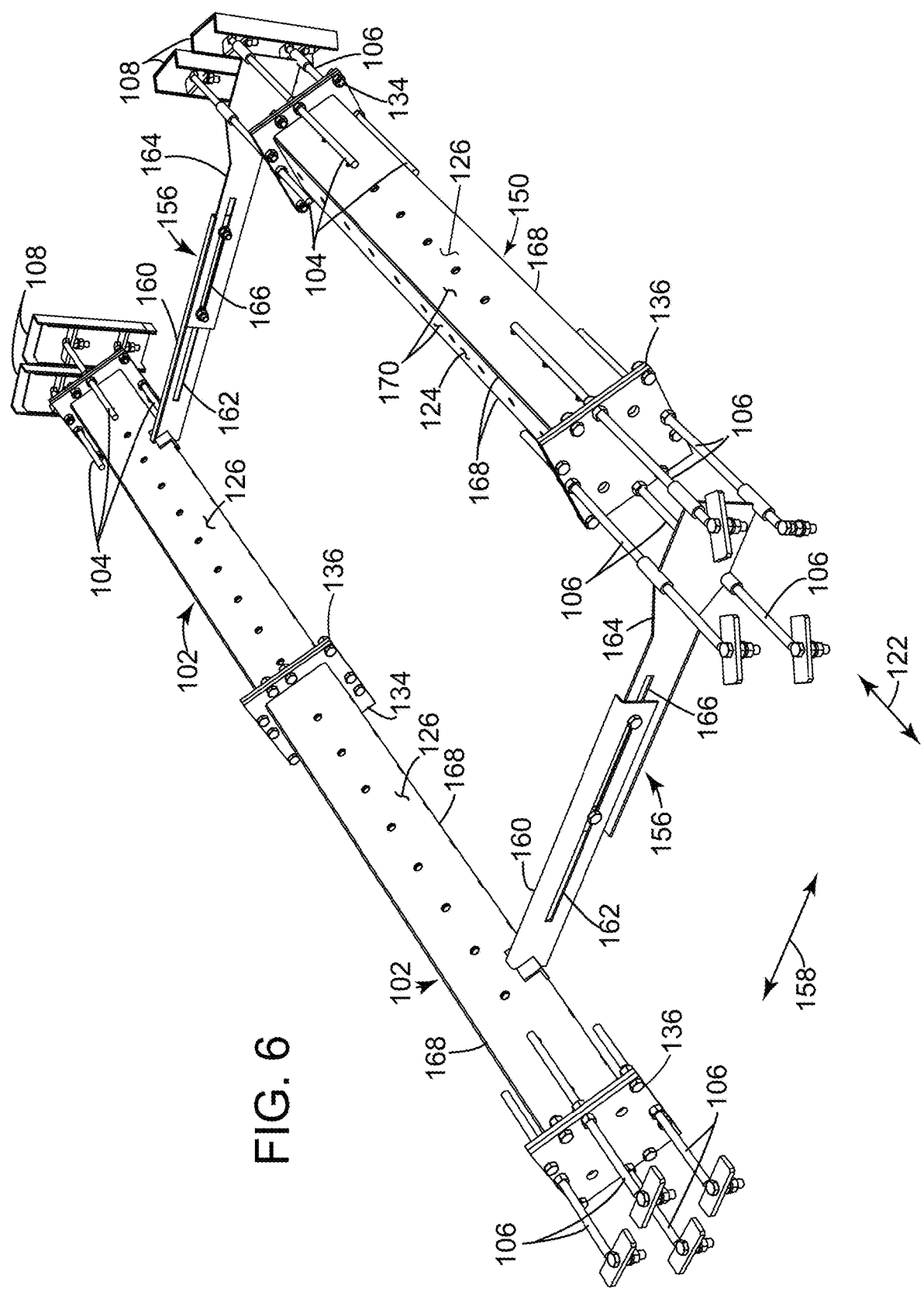
FIG. 6 depicts an example of a side perspective view in the direction of line 6-6 of FIG. 5 of the ultrasonic generator system of FIG. 5, according to aspects described herein.

Referring to FIGS. 5 and 6, an example is depicted of a top perspective view (FIG. 5) and a side perspective view in the direction of the line 6-6 of FIG. 5 (FIG. 6) of the ultrasonic generator system 100 having a plurality of first beam modules 102, a second beam module 150 and a third beam module 152 disposed within the tank 148.

As illustrated in FIG. 5, the first beam module 100 may be a plurality of first beam modules 102 that are connected together at a first end plate 134 and a second end plate 136 of each first beam module 100. Also, though not shown, it is within the scope of this disclosure that the second and third beam modules may also be a plurality of second and third beam modules respectively, that are also connected together at a first end plate 134 and a second end plate 136.

The first, second and third beam modules 102, 150, 154 are substantially the same or similar. Accordingly, any description of the second beam module may also be attributed to the third beam module.

The second beam module 150 may be positioned parallel to the first beam module 102 immediately over the bed of activated carbon (not shown) in the tank 148. The second beam module 150 also includes first and second end plates 134, 136, first and second pairs of transducers 114, 116 and first and second sidewalls 124, 126. The second beam module 150 may also be secured in the longitudinal direction 122 against the inner sidewalls 154 of the tank 148 by a plurality of first support rods 104 extending from the first end plate 134 of the second beam module 150 and a plurality of second support rods 106 extending from the second end plate 136 of the second beam 150.

A cross brace assembly 156 is connected between the first and second beam modules 102, 150 and presses in a lateral direction (as indicated by lateral directional arrow 158) against the first and second beam modules 102, 150 to secure the first and second beam modules 102, 150 in a lateral direction 158 against the curved or straight inner side walls 154 of the tank 148. The lateral direction 158, as used herein, is substantially perpendicular to the longitudinal direction 122.

The cross-brace assembly 156 includes a first brace plate 160 having a first slot 162. The first brace plate 160 being operable to be removably attached to one of the first and second sidewalls 124, 126, the first support rods 104 or the second support rods 106 of the first beam module 102. The cross-brace assembly 156 also includes a second brace plate 164 having a second slot 166. The second brace plate 164 being operable to be removably attached to one of the first and second sidewalls 124, 126, the first support rods 104 or the second support rods 106 of the second beam module 150. The first and second brace plates 160, 164 of the cross-brace assembly 156 are slidably bolted together through their respective first and second slots 162, 166 to secure the first and second beam modules 102, 150 in the lateral direction 158 within the tank 148.

Advantageously, by securing the first and second beam modules 102 and 150 in both the longitudinal direction 122 and the perpendiculars lateral direction 158, the first and second beam modules 102, 150 will not slide off of the curved inner side walls 154 of the tank 148. The first and second beam modules 102, 150 are secured in the longitudinal direction 122 by the first and second support rods 104, 106 that are pivotally attached to the first and second pair of feet 108, 112 respectively. The first and second beam modules 102, 150 are secured in the lateral direction 158 by the cross-brace assembly 156.

The first and second pair of opposing sidewalls 124, 126 of the beam 118 are welded together to form a square shaped beam 118 having four corners 168 and two pairs of adjacent first and second sidewalls 170. The square shaped beam 118 is operable to be oriented in the tank 148 such that two opposing corners 168 of the four corners 168 form a line extending in a vertical direction, which is in a general direction of flow of the pressurized water.

Advantageously, in this orientation, an upper pair 170 of the two pair of adjacent first and second sidewalls 170 have a downwardly oriented slope relative to the vertical direction. During regeneration with backflow, the bed of activated carbon expands above the beam 118 and over the upper pair of adjacent first and second sidewalls 170. However, when the backflow stops, the activated carbon does not settle onto the upper pair of adjacent first and second sidewalls 170 due to their downwardly oriented slope.

Figure 7:
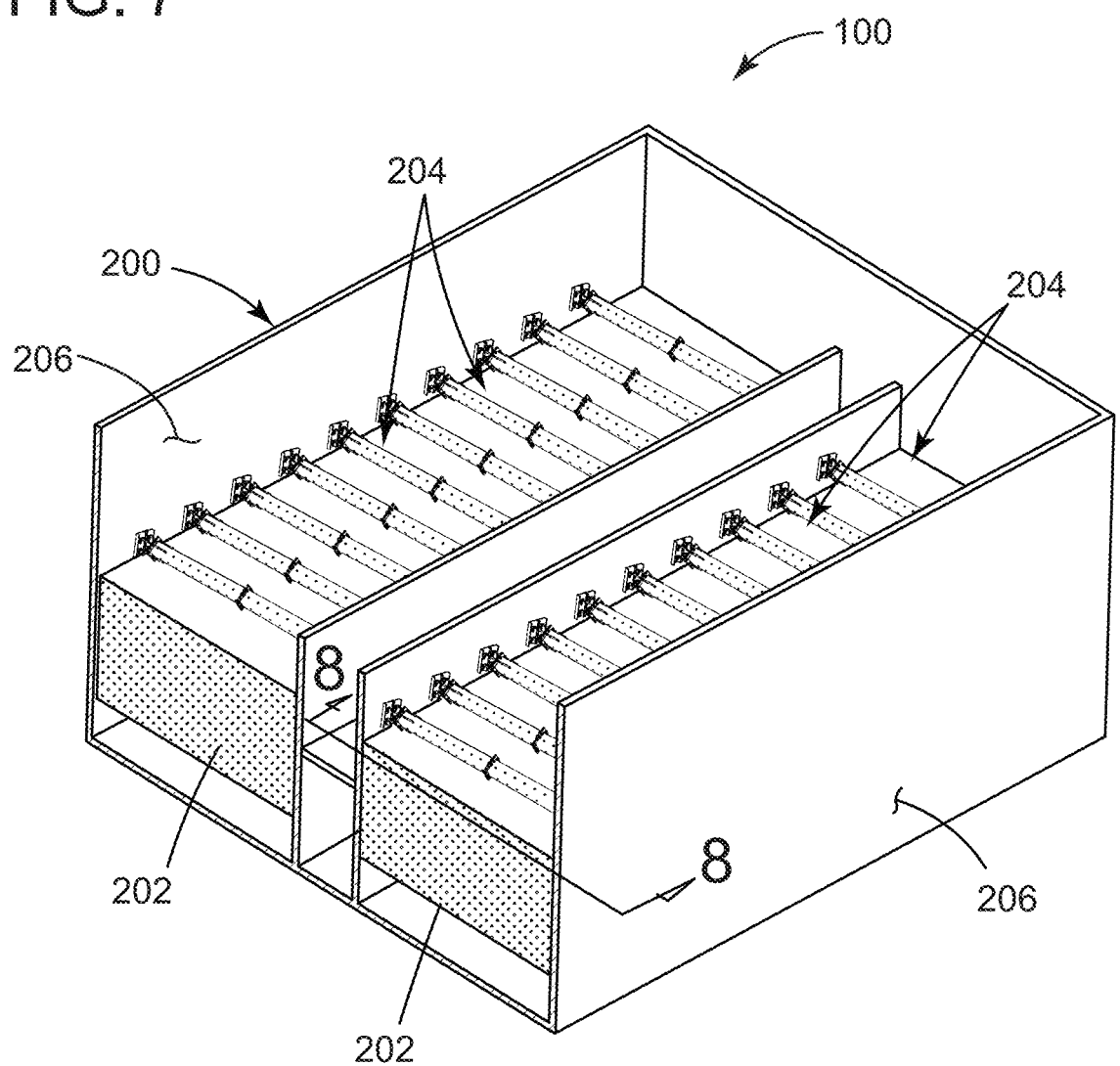
FIG. 7 depicts an example of a perspective view of a gravity filter tank with the ultrasonic generator system installed therein, in accordance with aspects described herein.
Figure 8:
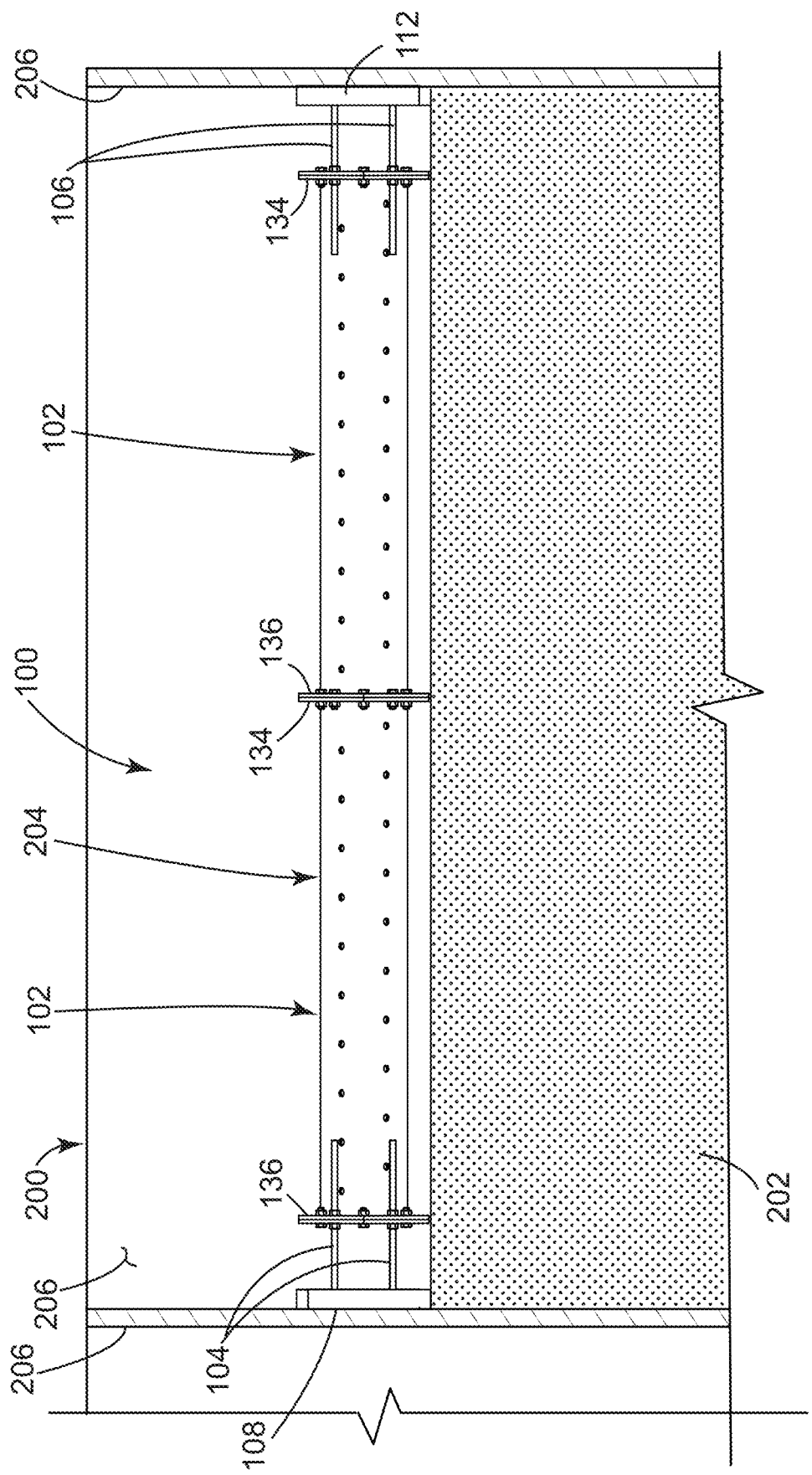
FIG. 8 depicts an example of a cross-sectional view of FIG. 7, taken along the line 8-8 of FIG. 7, in accordance with aspects described herein.

Referring to FIGS. 7 and 8, an example is depicted of a perspective view (FIG. 7) of a gravity filter tank 200 with the ultrasonic generator system 100 installed therein, and a cross sectional view (FIG. 8) taken along the line 8-8 of FIG. 7, in accordance with aspects described herein.

The gravity filter tank 200 includes an activated carbon bed 202. In the example illustrated in FIGS. 7 and 8, the ultrasonic generator system 100 includes a plurality of first beam modules 102 that are connected together at their first and second end plates 134, 136 to form a row 204 of beam members 102. Each row 204 of beam members 102 is removably secured to the tank 200 sidewalls 206 via first support rods 104 and a first pair of feet 108 at one distal end of the row 204 and via second support rods 106 and a second pair of feet 112 at an opposing distal and of the row 204 of beam members 102. A plurality of the rows 204 of beam members 102 may be installed immediately above the activated carbon bead 202. The rows 204 of beam members 102 may be parallel to each other across the entire activated carbon bead 202.

The gravity filter tank 200 is often used for large municipal scale installations. The high power density provided by the hollow square first beam modules 102 is advantageous to the regeneration of the activated carbon bed 202 and the opposing first and second pairs of transducers 114, 116 greatly enhances the achievable power density. The ability to move the first beams 102 or first beam rows 204 from filter to filter is also especially advantageous in open gravity filters, such as the type illustrated in FIGS. 7 and 8.

Note also, that for optimally efficient transmission of ultrasonic vibrations from the sidewalls (from the first and second pairs of sidewalls 124, 126) of the first beam modules 102, the sidewalls 124, 126 should be about 4 inches wide or greater when using commercially available ultrasonic transducers 114, 116. The compact hollow beam module 102 design provides that desirably width.

Figure 9:
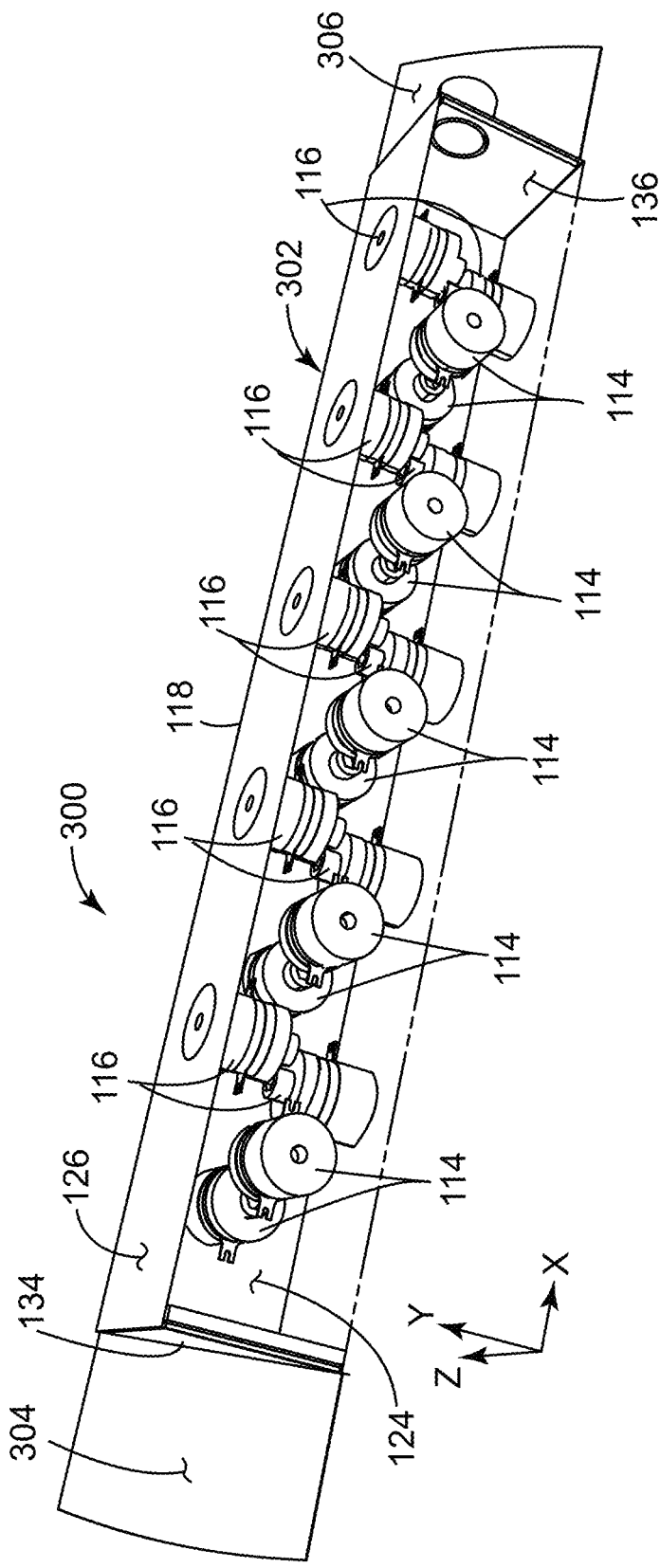
FIG. 9 depicts an example of a perspective view of an alternative embodiment of an ultrasonic generator system, wherein flexible tabs are used to secure the ultrasonic generator system to inner sidewalls of a filter tank, in accordance with aspects described herein.

Referring to FIGS. 9, 10A and 10B, an example is depicted of a perspective view (FIG. 9), a first side view (FIG. 10A) and a second side view (FIG. 10B) rotated 90 degrees relative to the first side view, of an alternative embodiment of an ultrasonic generator system 300, in accordance with aspects described herein. Substantially the same or similar features of the ultrasonic generator system 100 that are included in the ultrasonic generator system 300 are referred to with the same reference numbers used earlier herein. The ultrasonic generator system 300 differs from the ultrasonic generator system 100 primarily in the way the first beam module 302 is attached to inner walls of a filter tank 308 (see FIG. 11).

The first beam module 302 (herein referred to as the "beam module 302") of ultrasonic generator system 300 is similar to the first beam module 102 of ultrasonic generator system 100. More specifically, beam module 302 may include the same or similar first and second end plates 134, 136, the same or similar first and second pairs of transducers 114, 116 and the same or similar beam 118 as first beam module 102. Additionally, the same or similar beam 118 may include the same or similar first and second pairs of sidewalls 124, 126 as first beam module 102.

However, beam module 302 may not be attached to a plurality of first and second support rods 104, 106 as the first beam module 102 does. Rather, a first flexible tab 304 may be attached to the first end plate 134 of the beam module 302. The first flexible tab 304 extends in the longitudinal direction of the beam module 302 or beam 118. A second flexible tab 306 may be attached to the second end plate 136 of the first beam module 302. The second flexible tab 306 extends in an opposing longitudinal direction of the beam 118 relative to the first flexible tab 304.

The first and second flexible tabs 304, 306 are operable to flex against opposing inner sidewalls 310 of a filtering tank 308 (see FIG. 11), when the beam module 302 is positioned in the tank 308. The first and second flexible tabs 304, 306 are operable to press and secure the beam module 302 against the opposing inner sidewalls 310 of the tank 308 in the longitudinal direction of the beam 118.

The first and second flexible tabs 304, 306 may be composed of any material that is appropriate for the parameters required to function. For example, the first and second flexible tabs 304, 306 may be composed of thin gage stainless steel or any metal that is corrosion resistant to water or has a corrosion resistant coating. Additionally, the first and second tabs 304, 306 may be composed of a resilient plastic.

Figure 11:
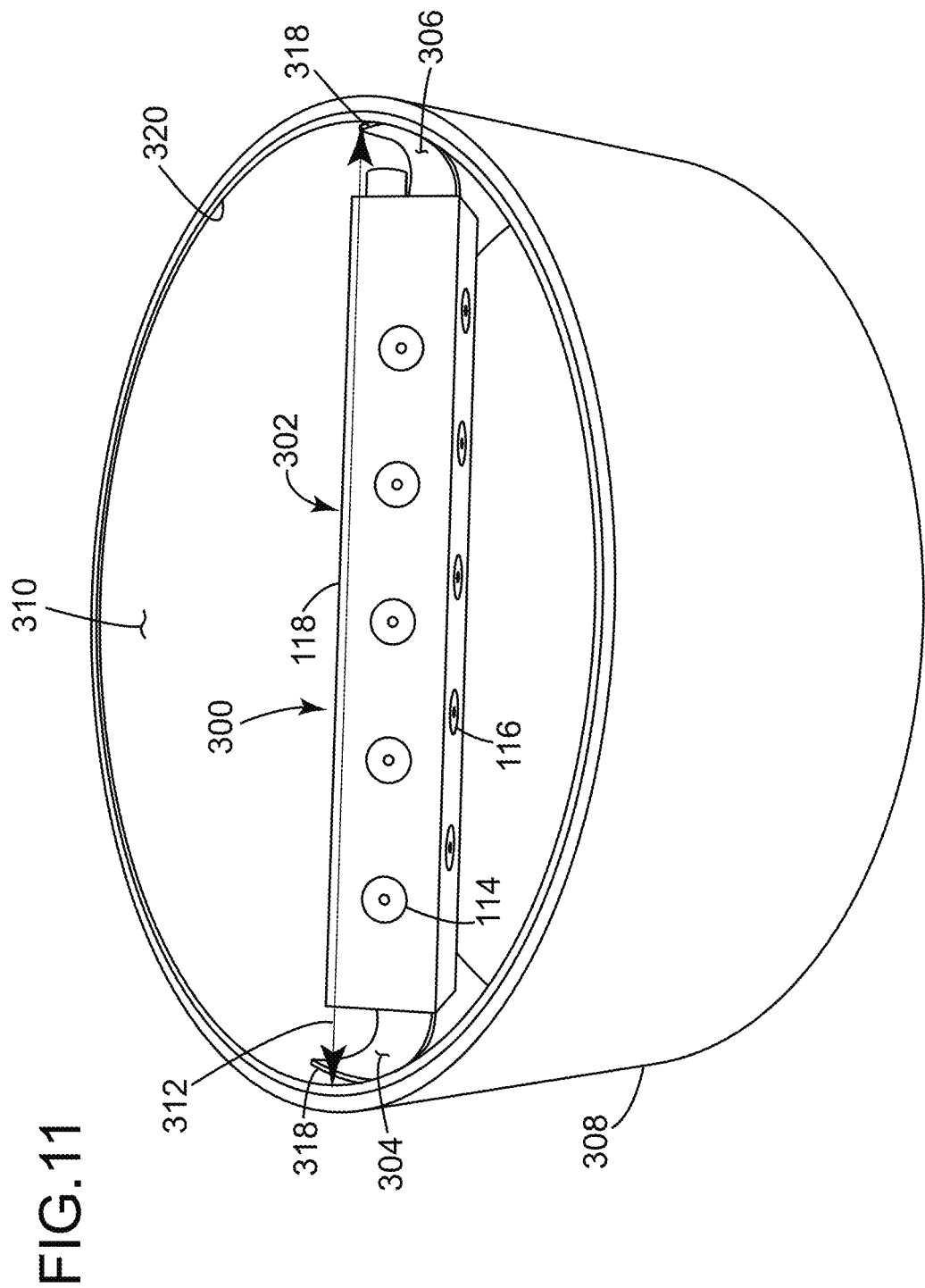
FIG. 11 depicts an example of a top perspective view of the ultrasonic generator system of FIG. 9 positioned within a tank, according to aspects described herein.

Referring to FIG. 11, an example is depicted of a top perspective view of the ultrasonic generator system 300 positioned within a filtering tank 308, according to aspects described herein. The tank 308 may be a circular tank 308 having an inner diameter 312. The ultrasonic generator system 300 may have an overall length 314 (see FIG. 10A), including the combined lengths of the beam module 302 and the tabs 304, 306, that is slightly larger than the inner diameter 312 of the tank 308. Additionally, the length 316 (see FIG. 10A) of just the beam module 302 may be slightly less than the inner diameter 312 of the tank 308. Also, the ultrasonic generator system 300 may be designed to fit though a four inch national pipe thread (4 inch NPT) hole (not shown) for easy installation into the tank 308.

Therefore, upon installation the ultrasonic generator system 300 may be slipped through a 4 inch NPT hole (not shown) and pressed down into the tank 308. The first and second flexible tabs 304, 306 are flexed upwards to allow the beam module 302 to be pressed downward to its final position in the tank 308. The first and second tabs may have a curved shape or may have their distal ends 318 (see FIG. 10A) curved to conform to the inner diameter 312 of the circular tank 308 as the beam module 302 is pressed into position.

The tank 308 may also include an inner liner 320 to protect against corrosion. The first and second flexible tabs 304, 306 may be configured to dig into the liner 320, when the beam module 302 is positioned in the tank 308, to prevent upward movement of the beam module 302 during backwashing of the tank 308.

The tabs 304, 306 prevent the beam from being moved in the longitudinal direction relative to the tank. Additionally, cross brace assemblies 156 (see FIG. 6) may be used to prevent lateral movement of the beam module 302. However, for smaller tanks no cross brace assemblies 156 may be required, because the beam module 302 may be positioned along the inner diameter 312 of the tank 308.

Referring to FIGS. 12A and 13A. An example is depicted (FIG. 12A) of a cross-sectional view of FIG. 10A taken along the line 12-12 to show an alternative embodiment of the first pair of ultrasonic transducers 114 disposed on the first pair of sidewalls 124, when the pressurized water 146 is not flowing. Also, an example is depicted (FIG. 13A) of a cross-sectional view of FIG. 10B taken along the line 13-13 to show an alternative embodiment of the second pair of ultrasonic transducers 116 on the second pair of sidewalls 126 when the pressurized water 146 is not flowing.

The embodiment of the first and second pairs of transducers 114, 116 of ultrasonic generator system 300 function similarly to embodiment of the first and second pairs of transducers 114, 116 of ultrasonic generators system 100. However, the transducers 114, 116 of ultrasonic generator system 300 may have a design that includes a mounting bolt 326 in the central area of the transducers 114, 116.

Accordingly, the centerlines 328 of the first and second pair of transducers 114, 116 may be offset to make room for the bolts 326, which results in the top surfaces 330 of each opposing first and second transducer 114, 116 only partially overlap. Therefore, the first air gap 130 (see FIG. 3A) that separates the first pair of transducers 114, when the pressurized water 146 is not flowing, may include a plurality of first air gaps. More specifically in this case, there are two first air gaps 130A and 130B between the overlapped portions of the top surfaces 330 of the transducers 114 and the bolts 326. Moreover, the second air gap 132 (see FIG. 4A) that separates the second pair of transducers 116, when the pressurized water 146 is not flowing, may include a plurality of second air gaps. More specifically in this case, there are two second air gaps 132A and 132B between the overlapped portions of the top surfaces 330 of the transducers 116 and the bolts 326.

Referring to FIGS. 12B and 13B. An example is depicted (FIG. 12B) of a cross-sectional view of FIG. 10A taken along the line 12-12 to show the first pair of ultrasonic transducers 114 disposed on the first pair of sidewalls 124, when the pressurized water 146 is flowing. Also, an example is depicted (FIG. 13B) of a cross-sectional view of FIG. 10B taken along the line 13-13 to show the second pair of ultrasonic transducers 116 on the second pair of sidewalls 126 when the pressurized water 146 is flowing.

As illustrated in FIGS. 12B and 13B, when the pressurized water 146 is flowing through the tank 308, the plurality of first gaps 130A, 130B and the plurality of second air gaps 132A, 132B are closed by water pressure exerted by the pressurized water 146 on the first and second pair of opposing sidewalls 124, 126.

Advantageously, once the pair of first transducers 114 abut together they provide structural support against the water pressure 146, preventing the first sidewalls 124 from collapsing any further. Also advantageously, once the pair of second transducers 116 abut together they provide structural support against the water pressure 146, preventing the second sidewalls 124 from collapsing any further.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. An ultrasonic generator system, comprising:
   a beam having a length extending in a longitudinal direction, the beam operable to be disposed in a tank, the tank housing a bed of activated carbon through which pressurized water flows, the beam comprising a first and a second pair of opposing sidewalls that define a hollow interior therebetween; and
   a first pair and a second pair of ultrasonic transducers disposed on the first and second pair of opposing sidewalls of the beam, respectively;
   wherein, when pressurized water is not flowing through the tank, then the first pair of transducers are separated by a first air gap and the second pair of transducers are separated by a second air gap; and
   when pressurized water is flowing through the tank, the first and second air gaps are closed by water pressure exerted by the pressurized water on the first and second pair of opposing sidewalls of the beam.

2. The ultrasonic generator system of claim 1, wherein:
   when pressurized water is not flowing through the tank and the first and second pair of transducers are separated by the first and second air gaps respectively, then the first and second pair of transducers are operable to generate ultrasonic vibrations to regenerate the activated carbon; and
   when the pressurized water is flowing through the tank and the first and second air gaps are closed by the water pressure, then the first pair of transducers abut together to provide structural support against the water pressure for the first pair of opposing sidewalls of the beam and the second pair of transducers abut together to provide structural support against the water pressure for the second pair of opposing sidewalls of the beam.

3. The ultrasonic generator system of claim 1 comprising:
   the first pair of transducers comprising a plurality of first pair of transducers; and
   the second pair of transducers comprising a plurality of second pair of transducers;
   wherein, each first pair and each second pair of transducers are alternately disposed along a longitudinal length of the interior of the beam.

4. The ultrasonic generator system of claim 1, wherein the beam comprises a first and a second end plate attached to opposing distal ends of the first and second pairs of sidewalls of the beam, the first and second end plates, first and second transducers and first and second sidewalls of the beam comprising a first beam module.

5. The ultrasonic generator system of claim 4, comprising:
   a plurality of first support rods each having a first and a second distal end, each first support rod attached to the first end plate of the first beam module at the first distal end of each first support rod;
   a plurality of second support rods each having a first and a second distal end, each second support rod attached to the second end plate of the first beam module at the first distal end of each second support rod;
   a first pair of feet pivotally attached to the second distal ends of each of the first support rods, each foot of the first pair of feet covered with a resilient material;
   and a second pair of feet pivotally attached to the second distal ends of each of the second support rods, each foot of the second pair of feet covered with a resilient material;
   wherein, the first and second pair of feet are operable to be adjusted by the first and second support rods respectively in opposing longitudinal directions relative to the length of the beam to press and secure the beam against inner sidewalls of the tank in the longitudinal direction; and
   wherein the first beam module is positioned over the bed of activated carbon, when the pressurized water is not flowing.

6. The ultrasonic generator system of claim 5, comprising:
   a second beam module positioned parallel to the first beam module over the bed of activated carbon, the second beam module also comprising first and second end plates, first and second transducers and first and second sidewalls, the second beam module also secured in the longitudinal direction against the inner sidewalls of the tank by a plurality of first support rods extending from the first end plate of the second beam module and a plurality of second support rods extending from the second end plate of the second beam module, and;
   a cross-brace assembly connected between the first and second beam modules and pressing in a lateral direction against the first and second beam modules to secure the first and second beam modules in a lateral direction against the inner sidewalls of the tank, the cross-brace assembly comprising:
   a first brace plate having a first slot, the first brace plate operable to be removably attached to one of the first and second sidewalls, the first support rods or the second support rods of the first beam module, and
   a second brace plate having a second slot, the second brace plate operable to be removably attached to one of the first and second sidewalls, the first support rods or to the second support rods of the second beam module,
   wherein the first and second brace plates are slidably bolted together through their respective first and second slots to secure the first and second beam modules in the lateral direction within the tank.

7. The ultrasonic generator system of claim 6, wherein:
   the first beam module comprises a plurality of first beam modules connected together at a first and a second end plate of each first beam module; and
   the second beam module comprises a plurality of second beam modules connected together at a first and a second end plate of each second beam module.

8. The ultrasonic generator system of claim 4, comprising:
   a first flexible tab attached to the first end plate of the first beam module and extending in the longitudinal direction of the beam; and a second flexible tab attached to the second end plate of the first beam module and extending in an opposing longitudinal direction of the beam;

wherein, the first and second flexible tabs are operable to flex against opposing inner sidewalls of the tank, when the first beam module is positioned in the tank, to press and secure the first beam module against the opposing inner sidewalls of the tank in the longitudinal direction of the beam.

9. The ultrasonic generator system of claim 1, comprising:

the first and second pair of opposing sidewalls of the beam being welded together to form a square shaped beam having four corners and two pairs of adjacent first and second sidewalls;

the square shaped beam being operable to be oriented in the tank such that two opposing corners of the four corners form a vertically extending line in a direction of flow of the pressurized water and an upper pair of the two pair of adjacent first and second sidewalls of the beam have a downwardly oriented slope relative to the vertical direction;

wherein, when the pressurized water flows upward, the bed of activated carbon expands above the beam and over the upper pair of adjacent first and second sidewalls of the beam, and when the pressurized water stops flowing, the activated carbon does not settle onto the upper pair of adjacent first and second sidewalls of the beam due to their downwardly oriented slope.

10. The ultrasonic generator system of claim 1, wherein:

the first air gap comprises a plurality of first air gaps and the second air gap comprises a plurality of second air gaps;

when pressurized water is not flowing through the tank, then the first pair of transducers are separated by the plurality of first air gaps and the second pair of transducers are separated by the plurality of second air gaps; and when pressurized water is flowing through the tank, the plurality of first gaps and the plurality of second air gaps are closed by water pressure exerted by the pressurized water on the first and second pair of opposing sidewalls of the beam.

11. An ultrasonic generator system, comprising:

a beam having a length extending in a longitudinal direction, the beam operable to be disposed in a tank, the tank housing a bed of activated carbon through which pressurized water flows, the beam comprising a first and a second pair of opposing sidewalls that define a hollow interior therebetween;

a plurality of first pair of ultrasonic transducers disposed on the first pair of opposing sidewalls of the beam; and a plurality of second pair of ultrasonic transducers disposed on the second pair of opposing sidewalls of the beam, wherein each first pair and each second pair of transducers are alternately disposed along a longitudinal length of the interior of the beam;

wherein, when pressurized water is not flowing through the tank, then each first pair of transducers are separated by a first air gap and each second pair of transducers are separated by a second air gap and the first and second pairs of transducers are operable to generate ultrasonic vibrations to regenerate the activated carbon; and when the pressurized water is flowing through the tank, then the first and second air gaps are closed by water pressure exerted by the pressurized water on the first and second pair of opposing sidewalls of the beam, and each pair of the first pair of transducers abut together to provide structural support against the water pressure for the first pair of opposing sidewalls of the beam and each pair of the second pair of transducers abut together to provide structural support against the water pressure for the second pair of opposing sidewalls of the beam.

12. The ultrasonic generator system of claim 11, wherein the beam comprises a first and a second end plate attached to opposing distal ends of the first and second pairs of sidewalls of the beam, the first and second end plates, the plurality of first and second transducers and first and second sidewalls of the beam comprising a first beam module.

13. The ultrasonic generator system of claim 12, comprising:

a plurality of first support rods each having a first and a second distal end, each first support rod attached to the first end plate of the first beam module at the first distal end of each first support rod;

a plurality of second support rods each having a first and a second distal end, each second support rod attached to the second end plate of the first beam module at the first distal end of each second support rod;

a first pair of feet pivotally attached to the second distal ends of each of the first support rods, each foot of the first pair of feet covered with a resilient material; and a second pair of feet pivotally attached to the second distal ends of each of the second support rods, each foot of the second pair of feet covered with a resilient material;

wherein, the first and second pair of feet are operable to be adjusted by the first and second support rods respectively in opposing longitudinal directions relative to the length of the beam to press and secure the beam against inner sidewalls of the tank in the longitudinal direction; and wherein the first beam module is positioned over the bed of activated carbon, when the pressurized water is not flowing.

14. The ultrasonic generator system of claim 13, comprising:

a second beam module positioned parallel to the first beam module over the bed of activated carbon, the second beam module also comprising first and second end plates, first and second transducers and first and second sidewalls, the second beam module also secured in the longitudinal direction against the inner sidewalls of the tank by a plurality of first support rods extending from the first end plate of the second beam module and a plurality of second support rods extending from the second end plate of the second beam module; and a cross-brace assembly connected between the first and second beam modules and pressing in a lateral direction against the first and second beam modules to secure the first and second beam modules in a lateral direction against the inner sidewalls of the tank, the cross-brace assembly comprising:

a first brace plate having a first slot, the first brace plate operable to be removably attached to one of the first and second sidewalls, the first support rods or the second support rods of the first beam module, and a second brace plate having a second slot, the second brace plate operable to be removably attached to one of the first and second sidewalls, the first support rods or the second support rods of the second beam module, wherein the first and second brace plates are slidably bolted together through their respective first and second slots to secure the first and second beam modules in the lateral direction within the tank.

15. The ultrasonic generator system of claim 12, comprising:
a first flexible tab attached to the first end plate of the first beam module and extending in the longitudinal direction of the beam; and
a second flexible tab attached to the second end plate of the first beam module and extending in an opposing longitudinal direction of the beam;
wherein, the first and second flexible tabs are operable to flex against opposing inner sidewalls of the tank, when the first beam module is positioned in the tank, to press and secure the first beam module against the opposing inner sidewalls of the tank in the longitudinal direction of the beam.

16. The ultrasonic generator system of claim 11, comprising:
the first and second pair of opposing sidewalls of the beam being welded together to form a square shaped beam having four corners and two pairs of adjacent first and second sidewalls;
the square shaped beam being operable to be oriented in the tank such that two opposing corners of the four corners form a vertically extending line in a direction of flow of the pressurized water and an upper pair of the two pair of adjacent first and second sidewalls of the beam have a downwardly oriented slope relative to the vertical direction;
wherein, when the pressurized water flows upward, the bed of activated carbon expands above the beam and over the upper pair of adjacent first and second sidewalls of the beam, and
when the pressurized water stops flowing, the activated carbon does not settle onto the upper pair of adjacent first and second sidewalls of the beam due to their downwardly oriented slope.

17. The ultrasonic generator system of claim 11, wherein:
the first air gap comprises a plurality of first air gaps and the second air gap comprises a plurality of second air gaps;
when pressurized water is not flowing through the tank, then the first pair of transducers are separated by the plurality of first air gaps and the second pair of transducers are separated by the plurality of second air gaps; and
when pressurized water is flowing through the tank, the plurality of first air gaps and the plurality of second air gaps are closed by water pressure exerted by the pressurized water on the first and second pair of opposing sidewalls of the beam.

18. A method of regenerating activated carbon, the method comprising:
providing an ultrasonic generator system, comprising:
a beam having a length extending in a longitudinal direction, the beam operable to be disposed in a tank, the tank housing a bed of activated carbon through which pressurized water flows, the beam comprising
a first and a second pair of opposing sidewalls that define a hollow interior therebetween;
a first pair and a second pair of ultrasonic transducers disposed on the first and second pair of opposing sidewalls of the beam, respectively, wherein the first pair of transducers are separated by a first air gap and the second pair of transducers are separated by a second air gap when pressurized water is not flowing in the tank, and
a first and a second end plate attached to opposing distal ends of the first and second pairs of sidewalls of the beam, the first and second end plates, first and second transducers and first and second sidewalls of the beam comprising a first beam module;
generating ultrasonic vibrations from the first and second pair of transducers to regenerate the activated carbon, when pressurized water in not flowing in the tank; and
closing the first and second air gaps by water pressure exerted on the first and second sidewalls of the beam when pressurized water is flowing in the tank, such that the first pair of transducers abut together to provide structural support against the water pressure for the first pair of opposing sidewalls of the beam and the second pair of transducers abut together to provide structural support against the water pressure for the second pair of opposing sidewalls of the beam.

19. The method of claim 18 comprising:
providing a plurality of first support rods and a plurality of second support rods, each first and second support rod having a first and a second distal end;
attaching a first distal end of each first support rod to the first end plate of the first beam module;
attaching a first distal end of each second support rod to the second end plate of the first beam module;
pivotally attaching a first pair of feet to the second distal ends of each of the first support rods, each foot of the first pair of feet covered with a resilient material;
pivotally attaching a second pair of feet to the second distal ends of each of the second support rods, each foot of the second pair of feet covered with a resilient material; and
adjusting the first and second pair of feet by the first and second support rods respectively in opposing longitudinal directions relative to the length of the beam to press and secure the beam against inner sidewalls of the tank in the longitudinal direction.

20. The method of claim 18 comprising:
attaching a first flexible tab to the first end plate of the first beam module, the first flexible tab extending in the longitudinal direction of the beam;
attaching a second flexible tab to the second end plate of the first beam module, the second flexible tab extending in an opposing longitudinal direction of the beam; and
positioning the first beam module in the tank such that the first and second flexible tabs flex against opposing inner sidewalls of the tank to press and secure the first beam module against the opposing inner sidewalls of the tank in the longitudinal direction of the beam.

* * * * *